July 4, 1950  J. H. LOWER  2,514,184
METHOD OF SPLICING THERMOPLASTIC MONOFILAMENTS
Filed June 20, 1946  7 Sheets-Sheet 2

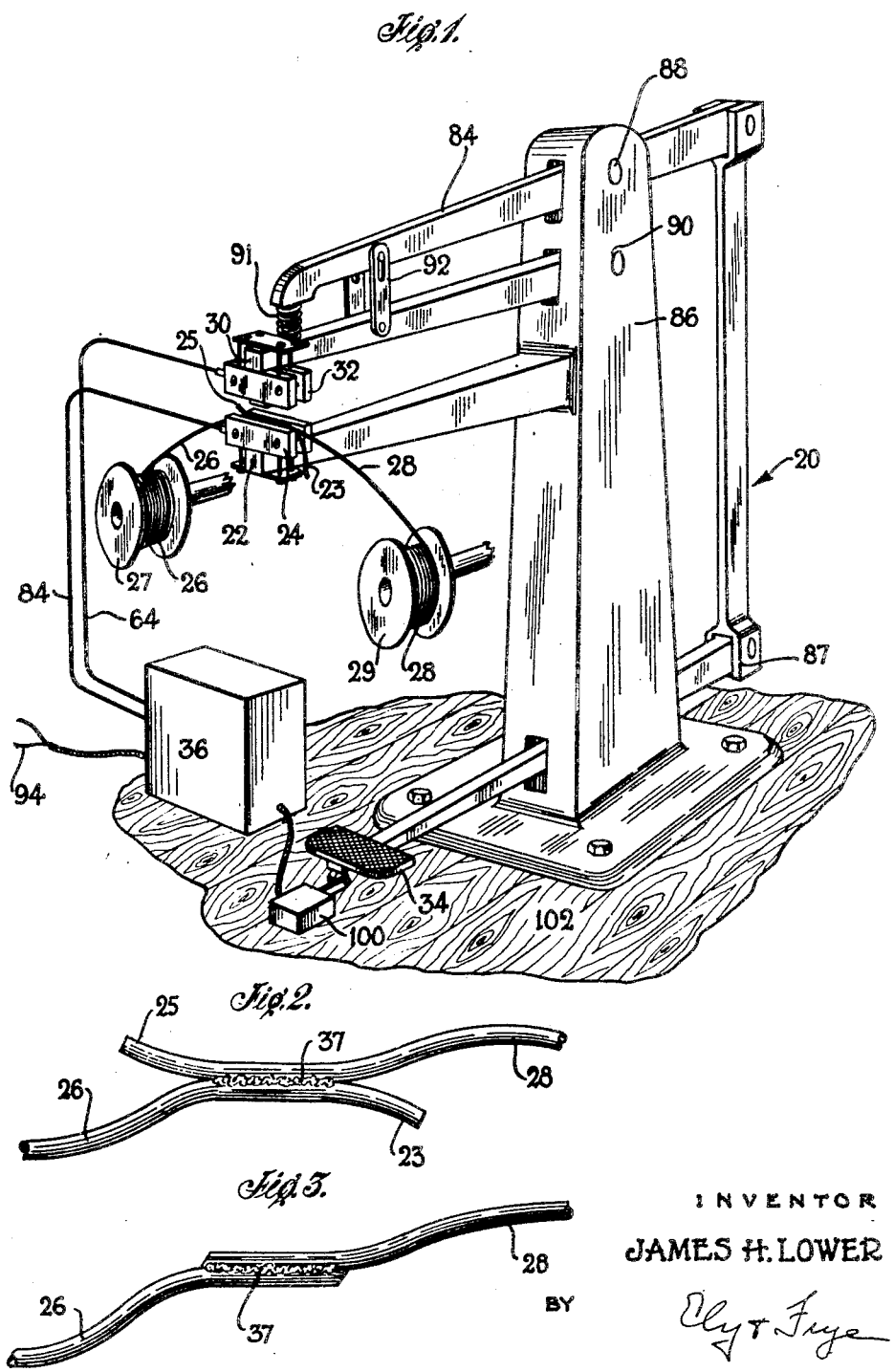

INVENTOR
JAMES H. LOWER
BY Ely & Frye
ATTORNEYS

July 4, 1950 J. H. LOWER 2,514,184
METHOD OF SPLICING THERMOPLASTIC MONOFILAMENTS
Filed June 20, 1946 7 Sheets-Sheet 3

INVENTOR
JAMES H. LOWER

BY Ely & Frye

ATTORNEYS

July 4, 1950 J. H. LOWER 2,514,184
METHOD OF SPLICING THERMOPLASTIC MONOFILAMENTS
Filed June 20, 1946 7 Sheets-Sheet 5
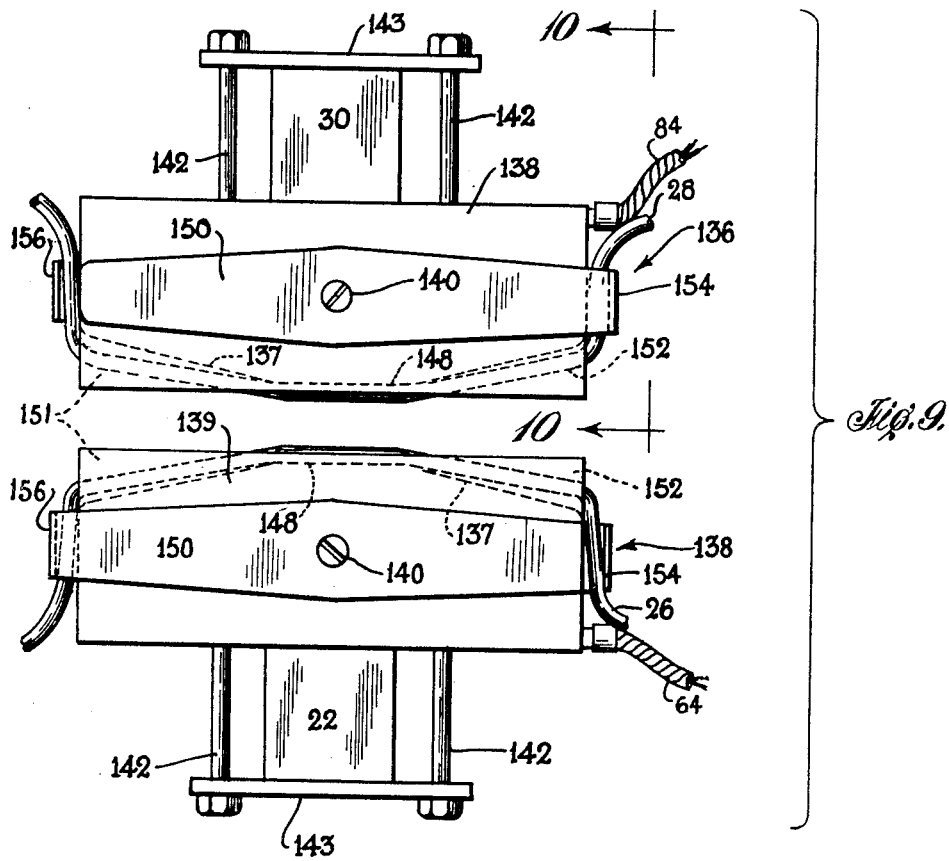
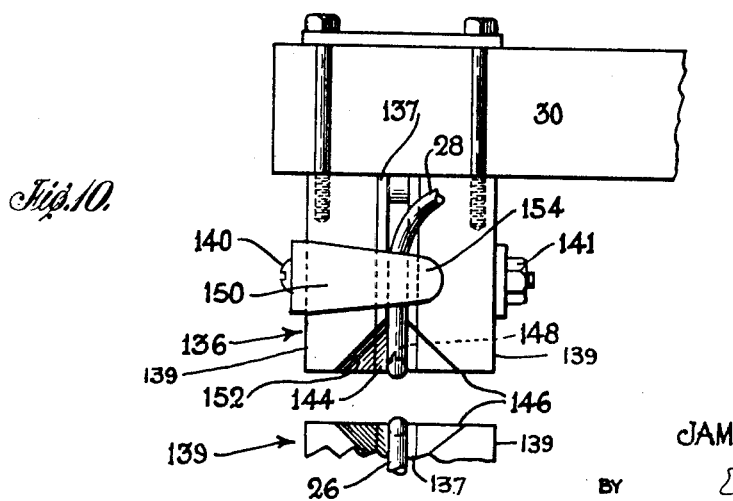
INVENTOR
JAMES H. LOWER
BY Ely & Frye
ATTORNEYS July 4, 1950  J. H. LOWER  2,514,184
METHOD OF SPLICING THERMOPLASTIC MONOFILAMENTS
Filed June 20, 1946  7 Sheets-Sheet 6

INVENTOR
JAMES H. LOWER
BY
Ely & Frye
ATTORNEYS

July 4, 1950          J. H. LOWER          2,514,184
METHOD OF SPLICING THERMOPLASTIC MONOFILAMENTS
Filed June 20, 1946          7 Sheets-Sheet 7
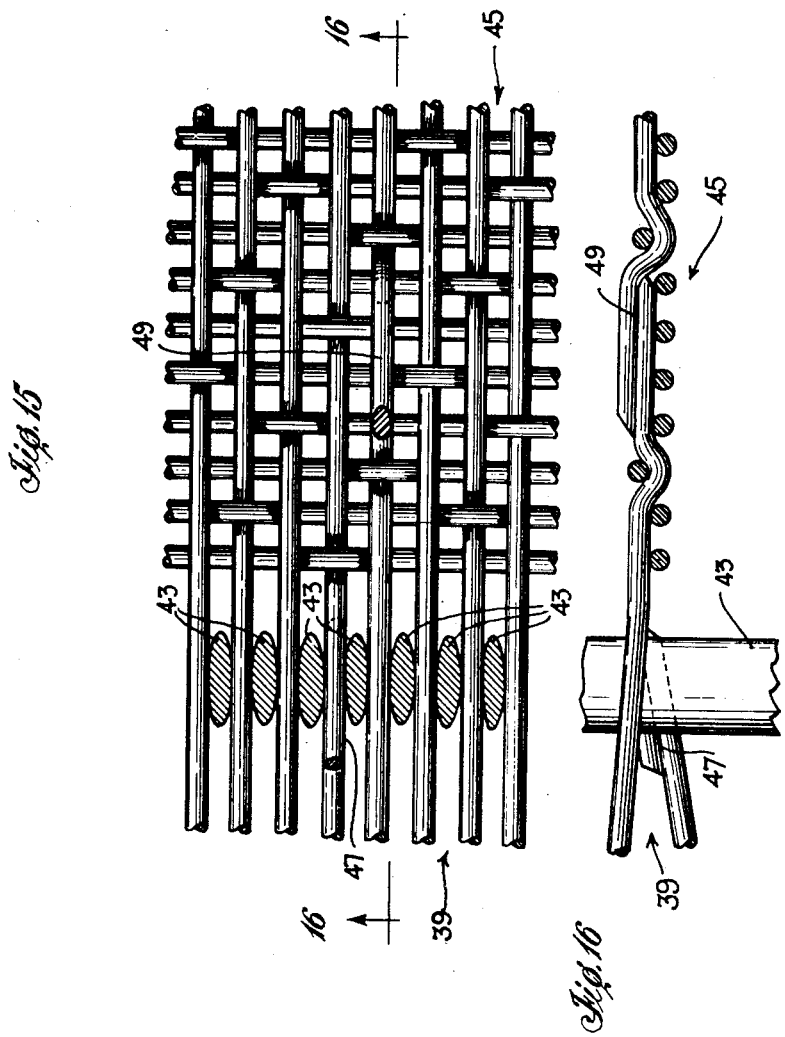
INVENTOR
JAMES H. LOWER
BY
ATTORNEYS Patented July 4, 1950

2,514,184

UNITED STATES PATENT OFFICE 2,514,184

METHOD OF SPLICING THERMOPLASTIC MONOFILAMENTS

James H. Lower, Fairlawn, N. J., assignor to The Firestone Tire & Rubber Company, Akron, Ohio, a corporation of Ohio Application June 20, 1946, Serial No. 677,984

1 Claim. (Cl. 154—90)

This invention relates to the splicing of organic thermoplastic monofilaments, and more particularly to the splicing of oriented organic thermoplastic monofilaments such as polyvinylidene chloride and nylon monofilaments.

As stated, this invention relates to the splicing of organic plastic monofilaments, i. e., wire-like, solid integral plastic strands of substantial cross section (say 25-400 circular mils cross sectional area) as distinguished from conventional textile threads composed of a number of very fine filaments held together by twist. In the working up of monofilaments into fabrics, screening, etc. considerable difficulty has been encountered in splicing together lengths of these filaments, as for instance where breaks occur, or where it is desired to make up packages, warps, etc., and the lengths of monofilament at hand are too short for the purpose. Knotting of the monofilaments is highly unsatisfactory; the mechanical strength of the knotted section is undesirably low; the knots are very prone to come untied during manufacturing operations, particularly in the warp, which is repeatedly flexed during weaving; and the knots form a particularly objectionable appearance in the final fabric, not encountered with ordinary multifilament fabrics, due to the relatively incompressible nature of the monofilaments. Splicing means, other than knotting, have likewise been found unsatisfactory; for instance, it has been conceived that monofilaments might be spliced together by means of adhesive cements. On account of the smooth, repellent, and non-adhesive character of the monofilament surfaces, however, this procedure was found unsatisfactory.

Accordingly, it is an object of this invention to provide a satisfactory method for splicing plastic monofilaments.

Another object is to provide such a method which will result in mechanically strong splices between lengths of monofilament.

A further object is to provide such a method which will result in splices which will withstand repeated flexure in any weaving, etc. operations to which they may be subjected, and which will operate smoothly in any textile working machinery employed.

Still another object is to provide splices which will be inconspicuous in the final woven or other fabrics.

A still further object is to secure the foregoing objects in a process which may be expeditiously carried out by relatively unskilled operators by means of relatively simple apparatus.

A still further object is to provide simple and practical apparatus for effecting splices between filaments as above set forth.

The above and other objects are secured, in accordance with this invention, by lapping and welding together the ends of the plastic monofilaments to be joined, the heat for the welding being supplied by subjecting the lapped ends to a high frequency electric field. There result, particularly when conditions are adjusted as more particularly set forth hereinafter, welded joints which approach, in strength, the continuous portions of the monofilaments. The welded joints reliably withstand all usual textile operations and are inconspicuous in the final fabric.

The conditions of field frequency, voltage, etc. applied to monofilaments to weld the same in accordance with this invention may be quite widely varied. The primary factor is the field frequency, selection of which will approximately determine the values of the other variable conditions to which the monofilaments must be subjected. A field frequency of at least 25 megacycles must be employed. Higher frequencies in the range 150-250 megacycles, are preferable, as they result in stronger and more reliable welds, and also permit of lower voltages and consequent lessened danger of arcing. Still higher frequencies would be desirable, but in most cases would require excessively elaborate equipment.

The voltage of the field to be applied to the monofilaments to be welded is very difficult to measure, and if measured, would have little significance apart from the geometry of the specific monofilaments and associated apparatus. For this reason, no more than qualitative instructions can be furnished on this point. In general, the voltage may be increased or decreased by means available to those skilled in the art. For instance, assuming that a vacuum tube oscillator is employed for supplying the power, the voltage may be increased by increasing the plate voltage of the oscillator; or by tightening the coupling between the plate and grid circuits of the oscillator; or by tightening the coupling between the plate circuit and the circuit supplying current to the lapped filaments; or by adjusting the length of power leads to the welding apparatus to coincide with maxima or less than maxima, of the resonance pattern thereof. The maximum possible voltage will be that at which arc discharge of the electric current occurs. Below this maximum voltage, the voltage should be adjusted to a value such as to secure a weld within a certain optimum time, more particularly set forth hereinafter; if, at any particular voltage, the formation of a weld requires a longer period than the optimum, the voltage should be increased; conversely, if a weld is formed in less than the optimum time, the voltage should be decreased.

The time during which the monofilaments are subjected to the electric field is quite critical. In general, the field should not be applied for a longer duration of time than is necessary to effect the weld, as the strength of the weld is deteriorated beyond this point. This duration is an inverse function of voltage and of frequency of applied field; with any selected frequency, the voltage should be adjusted as above described to secure welding in the optimum time for that frequency. These optimum times at various frequencies are:

*Table I*

| Frequency, megacycles | Optimum time, seconds |
|---|---|
| 25 | 2 |
| 50 | 3 |
| 100 | 10 |
| 150 | 15 |
| 175 | 25 |
| 250 | 30 |

As above noted, the monofilaments should be held together with a definite pressure during welding, which pressure should preferably be between about 3.0 lb. and about 6.0 lb. per linear inch of monofilament interface to be welded together. Higher and lower pressures may be used, but will result in inferior welds. This optimum pressure does not vary significantly with customary sizes of monofilaments.

A wide variety of thermoplastic monofilaments may be spliced together by means of the process of this invention, the principal criterion being that the material of which the monofilament is made shall be sufficiently thermoplastic so that monofilaments thereof will "heat seal," i. e., will adhere to one another when heated and pressed together. Suitable monofilaments will thus be seen to include, for instance, the oriented-crystalline monofilaments produced from polymers of vinylidene chloride and copolymers thereof with minor proportions of other unsaturated compounds copolymerizable therewith such as vinyl chloride, vinyl acetate, vinyl ethers, styrene, acrylic esters and nitriles, etc., examples of commercial products of this type being "Velon" or "Saran" products respectively of The Firestone Tire & Rubber Company and of The Dow Chemical Company. Another important class of thermoplastic monofilaments which may be spliced in accordance with this invention are the nylon monofilaments, which are oriented-crystalline high molecular polyamides such as condensation products of hexamethylene diamine with adipic acid, or condensates of -amino caproic acid, etc. Other monofilaments suitable for use in this invention include those comprising polymers of vinyl chloride and copolymers thereof with minor proportions of other unsaturated compounds copolymerizable therewith, such as vinyl acetate, vinylidene chloride, acrylic esters and nitriles, styrene, vinyl ethers and the like, an example of this type of fiber being marketed under the name of "Vinyon" by the Carbide and Carbon Chemicals Corporation; or cellulose derivatives such as cellulose acetate, ethyl cellulose, benzyl cellulose, etc. By the term "monofilament" it is intended to designate any wire-like, solid integral plastic strands of substantial cross sectional area (say 25–400 circular mils cross sectional area) as distinguished from conventional textile threads composed of a number of very fine filaments held together by virtue of their twist. By the term "monofilament" it is also intended to include conventional textile threads which have been impregnated and coated with plastic composition so as to provide a substantially solid monofilament of plastic composition reinforced by the fine filaments of the textile thread, an example of such a product being "Textron" a plastic-coated thread manufactured by the Freydberg Brothers-Strauss, Inc.

As above briefly noted, a considerable difficulty arises in the practice of this invention by virtue of the tendency of the electric currents to arc around the filaments, especially along the surfaces of any insulating materials used to support the monofilaments in welding position. Such arcing quickly destroys the insulating materials. Thus trouble may be minimized by keeping the surfaces of the insulating materials scrupulously clean. A more effective method, somewhat at variance with the foregoing recommendation for cleanliness, is to lightly coat the surfaces of the insulators with an oil, preferably of the paraffin type. Apparatus so coated has operated for days in an entirely satisfactory manner, while identical apparatus, operating under the same conditions without the oil coating, was destroyed in a few hours. The reasons for this phenomenon are obscure, and it is tentatively suggested that the oil film provides a more uniform and less abrupt electrical gradient through the surface of the insulation material. This technique is particularly satisfactory with ceramic insulating materials such as glass, porcelain, alumina and the like.

With the foregoing general discussion in mind, there will now be described specific forms of apparatus for carrying out the process of this invention. The apparatus is shown in the accompanying drawings in which:

Fig. 1 shows a perspective view of a press assembly arranged to weld plastic monofilaments according to this invention.

Fig. 2 shows an enlarged view of the spliced filaments before trimming.

Fig. 3 shows an enlarged view of the spliced filaments after trimming.

Figs. 9 and 10 show an alternative electrode assembly.

Fig. 11 is a front view of the lower electrode assembly similar to that of Fig. 4, with means for trimming the spliced filaments.

Fig. 12 is a top view of the assembly of Fig. 11.

Figs. 13 and 14 are respectively side and end views of cutting chisels used in Figs. 11 and 12.

Fig. 15 is an enlarged fragmentary top view of a warp of monofilaments spliced in accordance with this invention, together with the adjacent portion of the fabric into which the warp is being woven, and including a portion of the reed of the loom employed in the weaving.

Fig. 16 is a vertical section along the line 16—16 of Fig. 15.

Synopsis of entire apparatus, Figs. 1–3

Figure 4:
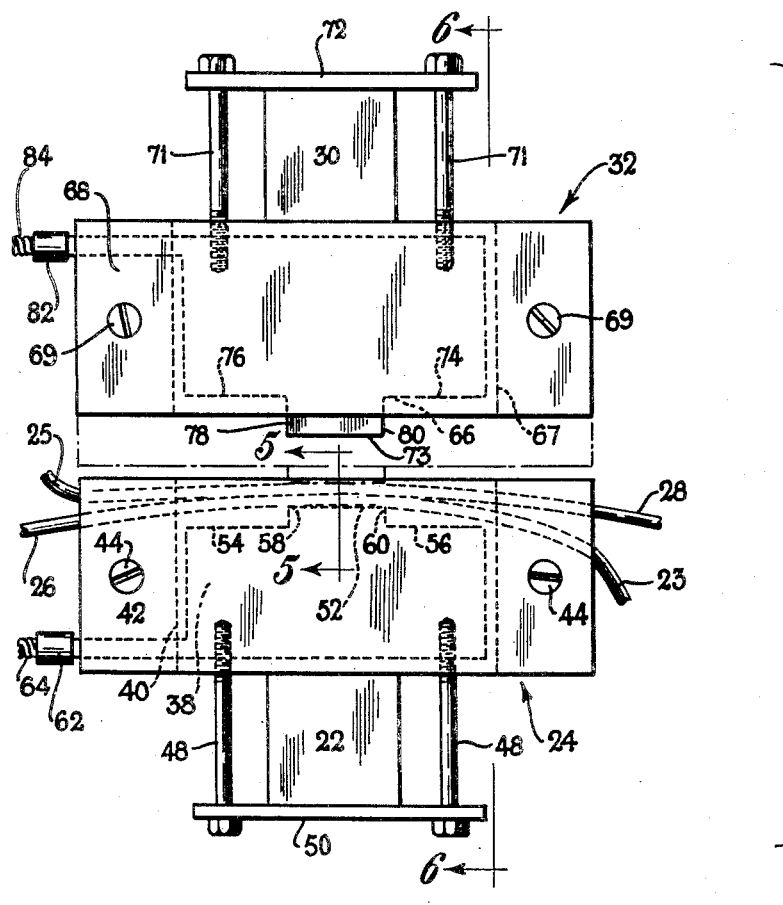
Fig. 4 shows an enlarged side view of the electrode assemblies in open position, together with the mode of inserting the monofilaments to be spliced.
Figure 5:
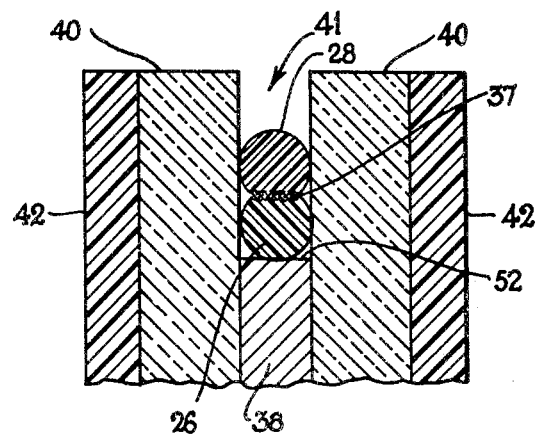
Fig. 5 is an enlarged section on the line 5—5 of Fig. 4.

Referring to the drawings, and first to Fig. 1, there is shown a kick press 20 having a lower stationary jaw 22 carrying a lower electrode assembly 24 adapted to hold, in overlapped relation, the ends 23, 25 of the monofilaments 26 and 28 which are to be spliced (see Figs. 4 and 5). The main lengths of the monofilaments are wound upon the rolls 27 and 29, and it will be noted that the loose ends 23, 25 of these rolls are allowed to extend beyond the welding apparatus. The movable upper jaw 30 of the press carries an upper electrode assembly 32 and is so arranged that, when the pedal 34 is depressed, the upper jaw 30 descends and carries the upper electrode assembly 32 down into mating engagement with the lower electrode assembly 24. A high frequency electric current from the vacuum tube oscillator 36 is then passed from the upper to the lower electrode assemblies through the lapped monofilaments 26 and 28, causing them to become heated and welded together along the zone 37 as shown in Fig. 2.

Figure 11:
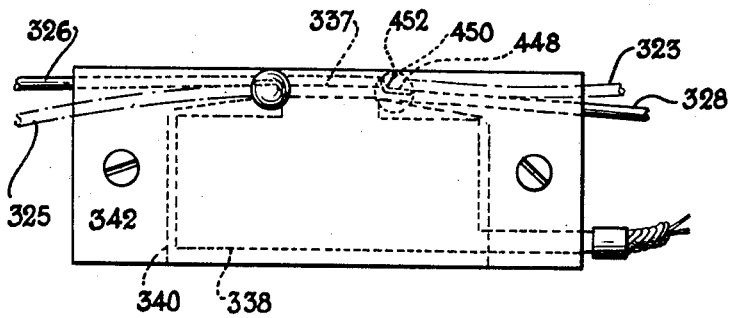
Figs. 11–14 show an electrode assembly similar to that of Fig. 4, together with means for automatically trimming the filaments after welding: in these figures.
Figure 12:
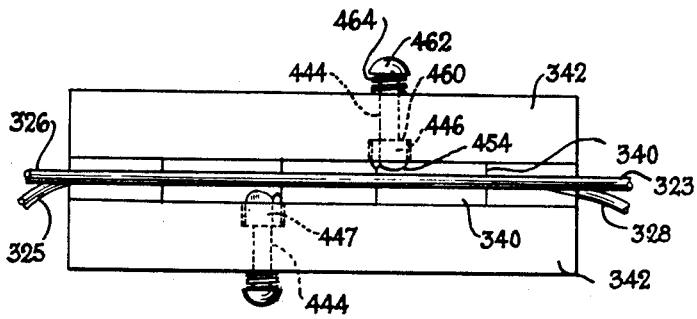
Figure 13:
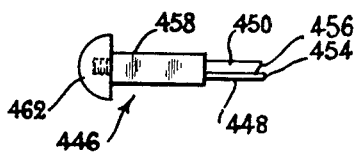
Figure 14:
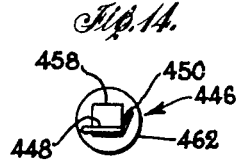

It will be noted (Fig. 2) the spliced monofilaments have excess ends 23, 25 since it is inconvenient, in practice, to insert the monofilaments so that their ends do not extend beyond the electrodes. These loose ends may be snipped off as indicated in Fig. 3 by means of scissors or by special cutters, more particularly described hereinbelow in connection with Fig. 11.

Figs. 15 and 16 illustrate the desirable features, both in the process of weaving, and in the finished fabric, of monofilaments spliced together in accordance with this invention. In these figures there is shown a portion of a warp of monofilaments 39 passing through the dents 43 of the reed of a loom (not shown) on which the warp 39 is being woven into a fabric 45. Certain of the monofilaments contain welded splices 47, 49 identical with that shown in Fig. 3. It will be seen that the splice 47 passes very smoothly between the dents 43, whereas a knot would be repeatedly abraded and disturbed by the reciprocation of the dents 43. In practice, it has been found that knots so situated frequently come untied, with consequent interruption to production. Likewise, it will be seen that the spliced portion 49 disturbs the continuity of the fabric 45 very little, whereas a conventional knot would be most unsightly.

The lower electrode assembly 24

This assembly is more particularly shown in Figs. 4–7 as comprising a sheet metal electrode 38 sandwiched between two glass plates 40 ("Pyrex #774," manufactured by the Corning Glass Works) in turn which are grasped between two blocks 42 of insulating material ("Melmac #592," manufactured by the American Cyanamid Company) which are held together by bolts 44 passing therethrough to nuts 46. The assembly is adjustably clamped to the lower press jaw 22 by means of screws 48 extending through a yoke 50 and into the blocks 42.

Figure 6:
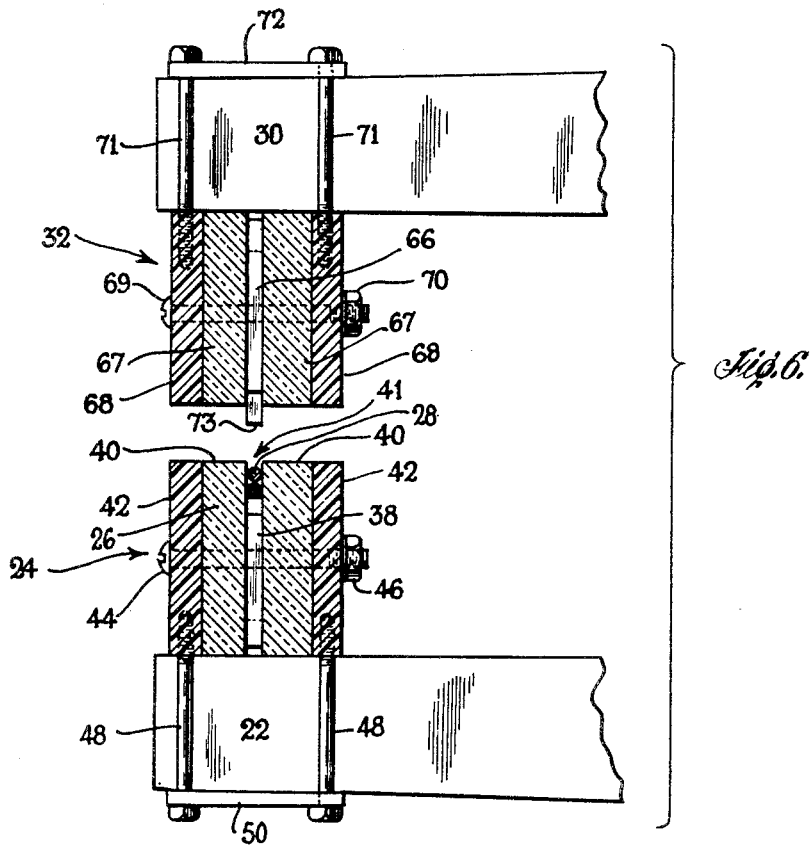
Fig. 6 is a section on the line 6—6 of Fig. 4.

The thickness of the electrode 38 is approximately the same as the diameter of the monofilaments, and the electrode terminates short of the upper edges of the glass plates 40, so as to define therewith a slot 41 into which the monofilaments 26 and 28 may be inserted in superposed, lapped relation as shown in Figs. 4–6.

The upper working edge 52 of the electrode is relieved at 54 and 56, so that the welding current and pressure are applied only along the land portion from 58 to 60. Portions 58 and 60 are rounded to avoid concentration of electrical stress.

The electrode also has a lug 62 extending from between the plates 40 for the attachment to a wire 64 connected to the oscillator 36.

The upper electrode assembly 32

The assembly more particularly comprises a sheet metal electrode 66 sandwiched between two glass plates 67 (Pyrex #774) which in turn are grasped between two blocks 68 of insulating material and held together by bolts 69 passing therethrough to nuts 70. The assembly is adjustably clamped to the upper press jaw 30 by means of screws 71 extending through the yoke 72 and into the blocks 68. The lower working edge 73 of the electrode extends downward from between the plates 67, and the upper and lower electrode assemblies 24 and 32 are so aligned that, when the upper press jaw 30 moves downwardly, the working edge 73 enters the slot 41 and compresses the superposed, lapped monofilaments 26, 28 together and against the land portion from 58 to 60 of the lower electrode 38. This is shown in dashed outline in Fig. 4, and also in full lines in Fig. 7.

Figure 7:
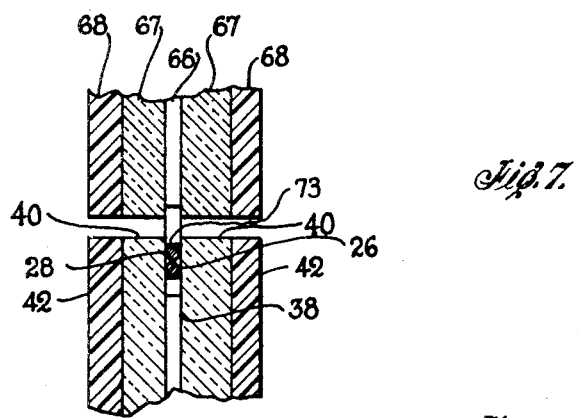
Fig. 7 is an enlarged portion of Fig. 6, with the electrodes in closed position.

Complementarily to the lower electrode 38, the working edge 73 of the electrode 66 is relieved at 74 and 76, so that only the intermediate land portion from 78 to 80 engages the filament; this land portion 78, 80 of the upper electrode is disposed opposite the land portion 58, 60 of the lower electrode as shown in Figs. 4, 6 and 7 so that the welding pressure and current are confined to the weld zone 37. Similarly to the lower electrode 38, the upper electrode is rounded at 78 and 80, and has a lug 82 extending from between the blocks 68 for connection to a wire 84 leading to the oscillator 26.

Kick press mechanism 20

Any conventional press mechanism may be used which will move the upper electrode assembly 32 into engagement with the lower electrode assembly 24. However since, as will appear from data hereinafter detailed, best results are obtained when the pressure of the electrodes upon the filaments is precisely regulated, the kick press mechanism should preferably include means for regulating the electrode pressure, regardless of the pressure exerted by the operator upon the pedal 34. In the specific mechanism shown, the press comprises a master arm 84 pivoted to the press standard 86 at 88 and connected by positive mechanical linkage 87 to the pedal 34 so that depressing the latter will positively rock the master arm 84 in counter clockwise sense in the drawing upon its pivot 88. The upper jaw 30 of the press is freely pivoted at 90 upon the standard 86, and a spring buffer 91 is interposed between the upper jaw and the master arm 84, so that the latter, when depressed by actuation of the pedal 34, thrusts the upper jaw 30 and electrode assembly 34 carried thereby downward into mating engagement with the lower electrode assembly 24. The limit of travel of the master arm 84 is set so as not to completely compress the spring buffer 91, so that the maximum pressure exerted by the electrodes upon the monofilaments will be governed solely by the tension of the spring buffer, regardless of the pressure exerted by the operator upon the pedal 34.

A slotted-link lost motion connection 92 is provided between the master arm 84 and the upper jaw 30, whereby the clockwise rocking of the master arm is permitted to compress the buffer 91, but when the master arm rocks counter-clockwise again, the lost motion is taken up, and the upper jaw and electrode assembly are retracted from the lower jaw and electrode assembly, permitting removal of the welded filaments.

The oscillator 36

Figure 8:
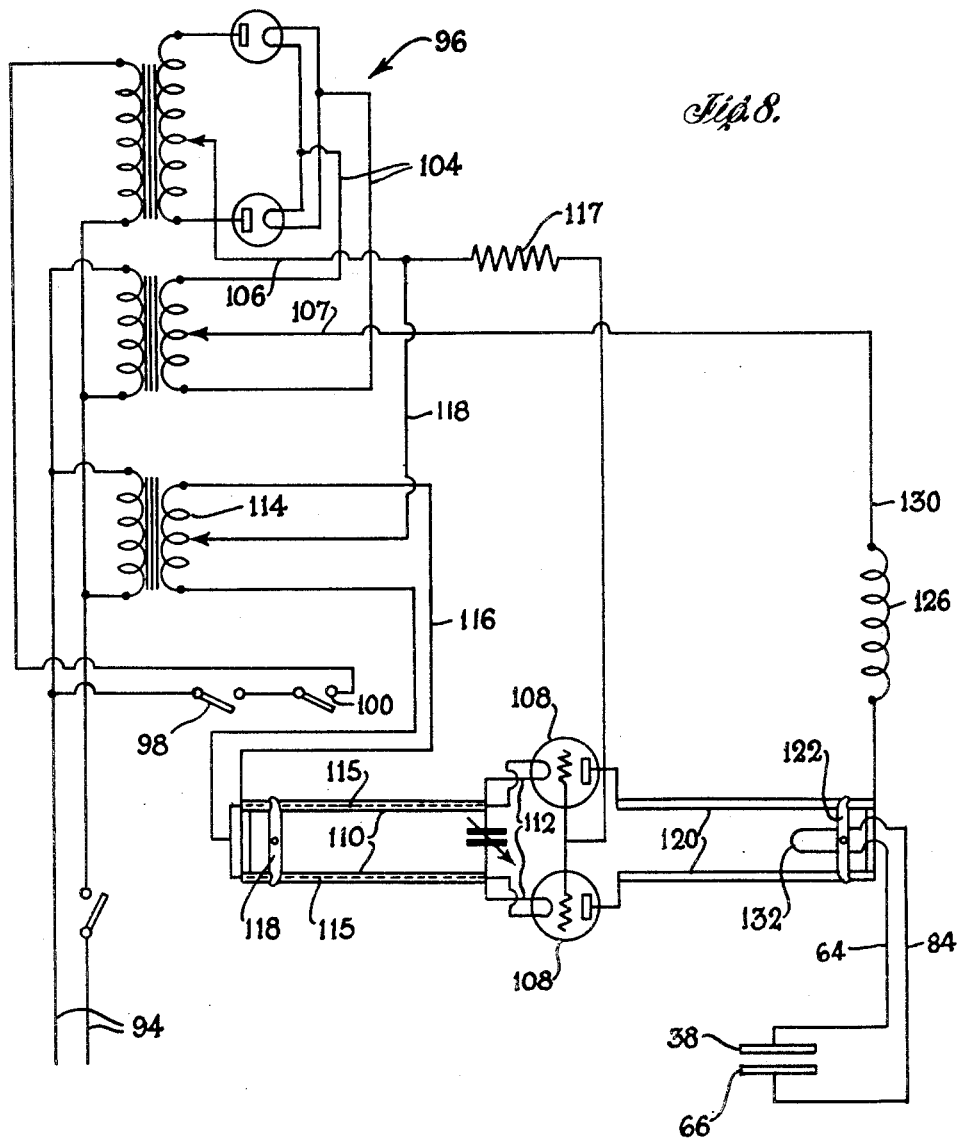
Fig. 8 is a wiring diagram of a high frequency generator for use in this invention.

Any vacuum tube oscillator may be used which is capable of generating currents of frequencies on the order of 25–250 megacycles, and of power requisite (usually drawing about 100–1000 watts plate power input) to effect a weld within the desired time. A suitable oscillator is shown in Fig. 8 as comprising a supply line 94 providing alternating current power: a full wave rectifier 96 drawing its plate power from the line through a self-resetting timing switch 98 and a limit switch 100 placed on the floor 102 beneath the pedal 34 so as to close circuit when the pedal is depressed. The filaments of the tubes in the rectifiers are supplied independently of the switches 98, 100 through wires 104. The rectifier has a rated output at its terminal 106, 107 of 2000 volts at 300 ma. D. C. In operation, when the operator depresses the pedal 34, it engages the switch 100 at the limit of its travel, thereby supplying plate power to the rectifier so that rectified high voltage becomes available at the output terminals 106 and 107. The timing switch 100 is arranged to automatically break circuit at the end of the interval for which it is set, and to reclose itself in readiness for the next cycle of operations.

The oscillator proper more particularly includes two T-40 tubes 108, having a filament-grid tuning circuit comprising two ⅞" O. D. copper tubes 110, 12" long and spaced ⅞" apart, connected to one end of the filaments of the tubes by wires 112. The filaments are heated by current derived from the transformer 114 through insulated wires 115 threaded through the copper tubes 110 and connected to those ends of the filaments of the tubes 108 to which the copper tubes 110 are not connected. Return of heating current is via wires 112, copper tubes 110, and wires 116. The filament-grid tuning circuit 110 is completed by a conducting bridge 118 across the tubes 110 which is slidable along the tubes to tune the circuit. The grids of the tubes 108 are connected together and to the center tap of the filament transformer 114 through a leak resistor 117.

The plate circuit comprises a connection 118 from the negative terminal 106 of the rectifier to the center tap of the filament transformer 114. The plates of the tubes 108 are connected to a tank circuit comprising a pair of ⅞" O. D. copper tubes 120 12" long spaced ⅞" apart and provided with a sliding conducting bridge 122 for tuning. Return to the positive terminal 107 is via radio frequency choke 126 (20 mh.) and wire 130.

High frequency power is abstracted from the plate circuit by means of a hair pin loop 132 of ¼" copper tubing, mounted so as to be movable into or out of the field of the tank circuit 120, 122 to increase or decrease the voltage applied to the electrodes 38, 66.

Optimum conditions of operation

A series of welds were made between filaments with the apparatus of Fig. 1, using various types of plastic monofilaments at various frequencies: various times of welding and correlated applied voltages: and various degrees of pressure on the electrodes as set forth herewith in Table II. From a consideration of the table, it will be apparent that best results are obtained with pressures of from about 3.0 lb. to about 6.0 lb. per linear inch (Table II, items Nos. 12–15), and that the optimum times welding follow the schedule of Table I (see Table II, items Nos. 2 and 10).

Table II

| Item No. | Filament Material | Filament Diameter, mils | Frequency, megacycles | Time, seconds | Pressure (# per inch of filament) | Tensile strength, pounds |
|---|---|---|---|---|---|---|
| 1 | Saran¹ | 15 | 25 | 3 | 4 | 2.6 |
| 2 | | | 50 | 3 | 4 | 3.3 |
| 3 | | | | 1 | 4 | 3.3 |
| 4 | | | | 5 | 4 | 2.9 |
| 5 | | | | 6 | 4 | 2.8 |
| 6 | Saran¹ | 15 | 50 | 10 | 4 | 2.2 |
| 7 | | | | 15 | 4 | 1.6 |
| 8 | | | 175 | 2 | 4 | 3.3 |
| 9 | | | | 10 | 4 | 4.0 |
| 10 | | | | 25 | 4 | 4.7 |
| 11 | Saran¹ | 15 | 175 | 40 | 4 | 4.0 |
| 12 | | | | 25 | 1.5 | 3.7 |
| 13 | | | | | 2.0 | 4.3 |
| 14 | | | | | 4.0 | 4.7 |
| 15 | | | | | 6.0 | 4.3 |
| 16 | Saran¹ | 10 | 175 | 25 | 4 | 2.1 |
| 17 | Nylon² | 15 | 175 | 25 | 4 | 9.0 |
| 18 | Tetron³ | 18 | 175 | 25 | 4 | 6.0 |

[1] Olive drab formulation of vinylidene chloride resin, oriented after extrusion.
[2] Unpigmented nylon filament, oriented after extrusion.
[3] Plastic coated filaments manufactured by Freydberg Bros.-Strauss Inc.

Modified electrode assembly (Figs. 9 and 10)

A modified form of the welding electrode arrangement is shown in Figs. 9 and 10 as comprising identical upper and lower electrode assemblies 136, 138 secured respectively to the upper and lower jaws 30, 22 of the kick press 20. Each electrode assembly comprises a sheet metal electrode 137 sandwiched between a pair of blocks 139 of insulating material, which blocks are compressed together by means of a screw 140 passing therethrough into nuts 141. Each electrode assembly is secured to its corresponding press jaw by means of screws 142 passing through yokes 143 and into the insulating blocks 139. Each electrode 137 is slightly wider than the monofilaments 26, 28 to be welded, and the working surface 144 thereof is set flush with the blocks 138, forming therewith a substantially plane surface 146. A groove 148 is cut longitudinally of each electrode 136 to a depth of about half the diameter of the monofilaments 26, 28, so that they may be cradled therein as shown in Figs. 9 and 10. The upper and lower electrode assemblies are aligned, so that, upon closure of the jaws of the press, the monofilaments, 18, 20 cradled in the grooves 148 are pressed together in overlapping relation. A high frequency current is then passed between the electrodes 136, effecting a weld of the monofilaments.

Various means may be employed for inserting and retaining the monofilaments in the grooves 148. One simple means comprises a pair of notches, 151 and 152 cut out of each end of the electrode assembly with their apexes coinciding with the groove 148. A pair of spring clips 158 are secured to the assembly by the screws 140 and have ears 154, 156 yieldably embracing the ends of the electrode assembly. In use, to insert a monofilament such as 26 into the groove in cradled position, one end of the filament is slipped under the ear 154; the filament is drawn over the notch 150; over the groove 148; down into the notch 151; and under the ear 156. The filament is held taut during these operations, so that the notches 150, 151 guide the filament into the groove 148. The spring ears 154, 156 hold the filaments taut in the groove 148 during the welding operations.

Trimming knife assembly

Figs. 11–15 show a lower electrode assembly similar to the electrode assembly 24 of Figs. 1–6 and designed to replace the same, and being provided with means for cutting off the excess ends 323, 325 of the monofilaments 326, 328 after the conclusion of the welding operation. The assembly more particularly comprises a sheet metal electrode 338, glass plates 340, and insulating blocks 342 all similarly constructed and arranged upon the lower jaw 22 of the press as are the corresponding elements 38, 40 and 42 of Fig. 4. (To indicate parts in Figs. 11–14 corresponding to those in Figs. 1–6, the reference characters in Figs. 1–6 have been increased by 300; thus 38 in Fig. 4 is the same element as 338 in Fig. 13, and so on.) The insulating blocks 342 are of considerable width and have slideways 444 pierced therethrough, in which chisels 446 and 447 reciprocate for the purpose of cutting off the excess ends 323, 325 of the monofilaments.

The chisel 446 comprises a horizontally directed dividing portion 448 and an upwardly directed cutting portion 450, its edge being aligned with the end 452 of the welded zone of the filament. The forward end of the dividing portion 448 is ground off to provide a slanting separating blade 454 extending between the monofilament 328 and the excess end 323. The function of this separating portion is to pry the monofilament and excess end apart as the knife 446 is pushed toward the monofilaments. The forward end of the cutting portion 450 is ground to a cutting edge 456. In operation, assuming that a weld has just been completed between the monofilaments, the chisel 446 is pushed in its slideway, toward the monofilaments. The separating blade 454 enters between the monofilaments and forces them apart. Continued motion of the chisel brings the cutting edge 456 into engagement with that portion of the loose end 323 immediately adjacent the welded zone 337 whereby the loose end 323 is clipped off.

The rear portion 458 of the chisel is square in cross section, and the corresponding rear portion of the slideway 444 is likewise square in cross section and snugly embraces the square portion 458 of the chisel, so as to permit the chisel to be reciprocated longitudinally while preventing rotation thereof about its longitudinal axis—which rotation, if not restrained, would spoil the register of the chisel with the filaments. The forward end of the slideway 444 is enlarged to form a pocket 460 into which the chisel is withdrawn when not in action. The blades 448, 450 abut the rear walls of the pocket 460 so as to limit the retraction of the chisel. The exterior end of the chisel provided with a knob 462, which may be pressed to actuate the chisel to trim off the excess end 323. A helical compression spring 464 surrounds the chisel between the knob 462 and the block 342 to retract the chisel after such actuation.

The chisel 447 is arranged and constructed identically to the chisel 446, but is positioned to cut off the loose end 325. The knives 346 and 347 are shown as being provided with knobs 462, whereby they may be manually reciprocated to effect the cutting action. However, pneumatic or electrical means may be provided to effect this movement automatically upon the conclusion of the welding operation.

From a consideration of the foregoing description, it will be seen that this invention provides a novel method and apparatus for effecting splices between thermoplastic monofilaments. The apparatus and procedure involved are simple and inexpensive, and the welded filaments are strongly and permanently united.

What is claimed is:

Process which comprises overlapping, in parallel relationship, the ends of two lengths of thermoplastic monofilament, confining said overlapped monofilaments between two parallel walls of ceramic insulating material, the surfaces of the walls adjacent the monofilaments being coated with oil, compressing said monofilaments together within the space between said walls by means of metallic electrodes, with a force of from about 3.0 to about 6.0 pounds per linear inch of overlapped monofilaments, and supplying to the electrodes an alternating potential having a frequency of from about 150 to about 250 megacycles and of voltage such that a weld is effected between the filaments within a period of time which is a function of the frequency employed, substantially in accordance with the table:

| Frequency Employed, megacycles | Time of Weld, seconds |
|---|---|
| 150 | 15 |
| 175 | 25 |
| 250 | 30 |

JAMES H. LOWER.

(References on following page)

REFERENCES CITED

The following references are of record in the file of this patent:

UNITED STATES PATENTS

| Number | Name | Date |
|---|---|---|
| 2,279,299 | Cavanaugh | Apr. 14, 1942 |
| 2,317,281 | Linguist | Apr. 20, 1943 |
| 2,324,068 | Crandell | July 13, 1943 |
| 2,390,266 | Novotny | Dec. 4, 1945 |
| 2,402,609 | Brabander | June 25, 1946 |
| 2,405,037 | Hsu | July 30, 1946 |
| 2,435,467 | Spencer | Feb. 3, 1948 |

OTHER REFERENCES

Hoyler: An electronic "Sewing Machine," reprint from the August 1943 issue of Electronics.

"Plastics," September 1944, pages 30, 32, 95, 96.